United States Patent [19]

Honjo et al.

[11] Patent Number: 4,997,260
[45] Date of Patent: Mar. 5, 1991

[54] OPTICAL FIBER HAVING A PROTECTIVE COATING

[76] Inventors: Makoto Honjo; Tatsuya Kakuta; Toru Yamanishi, all of c/o Yokohama Works of Sumitomo Electric Industries, Ltd., 1, Taya-cho, Sakae-ku, Yokohama-shi, Kanagawa-ken, Japan

[21] Appl. No.: 456,955

[22] Filed: Dec. 26, 1989

[30] Foreign Application Priority Data

Dec. 28, 1988 [JP] Japan .................. 63-328973
Mar. 13, 1989 [JP] Japan .................. 1-57890

[51] Int. Cl.$^5$ .................. G02B 6/00; B05D 3/04; B32B 7/02; C08J 83/04
[52] U.S. Cl. .................. 350/96.34; 427/302; 428/212; 524/862; 528/15

[58] Field of Search .................. 350/96.10, 96.30, 96.31, 350/96.32, 96.33, 96.34; 524/862, 865; 528/15, 31; 427/302; 428/212

[56] References Cited

U.S. PATENT DOCUMENTS 4,477,626 10/1984 Suzuki .................. 524/862
4,517,238 5/1985 Mine et al. .................. 428/212
4,740,055 4/1988 Kanda et al. .................. 350/96.34 X Primary Examiner—Akm Ullah
Attorney, Agent, or Firm—Cushman, Darby & Cushman

[57] ABSTRACT

An optical fiber which comprises a light-guiding glass fiber and a coating around the glass fiber, the coating consisting of at least two layers of polyorganosiloxane resin compositions having a ladder portion and a linear portion, and a ratio of the ladder portion and the linear portion in one layer being different from that in other layer, has good strength and good thermal resistance.

4 Claims, 1 Drawing Sheet

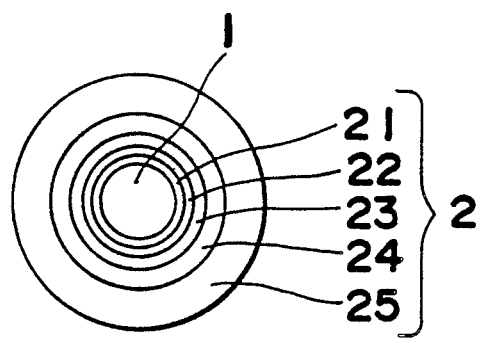
Fig. 2
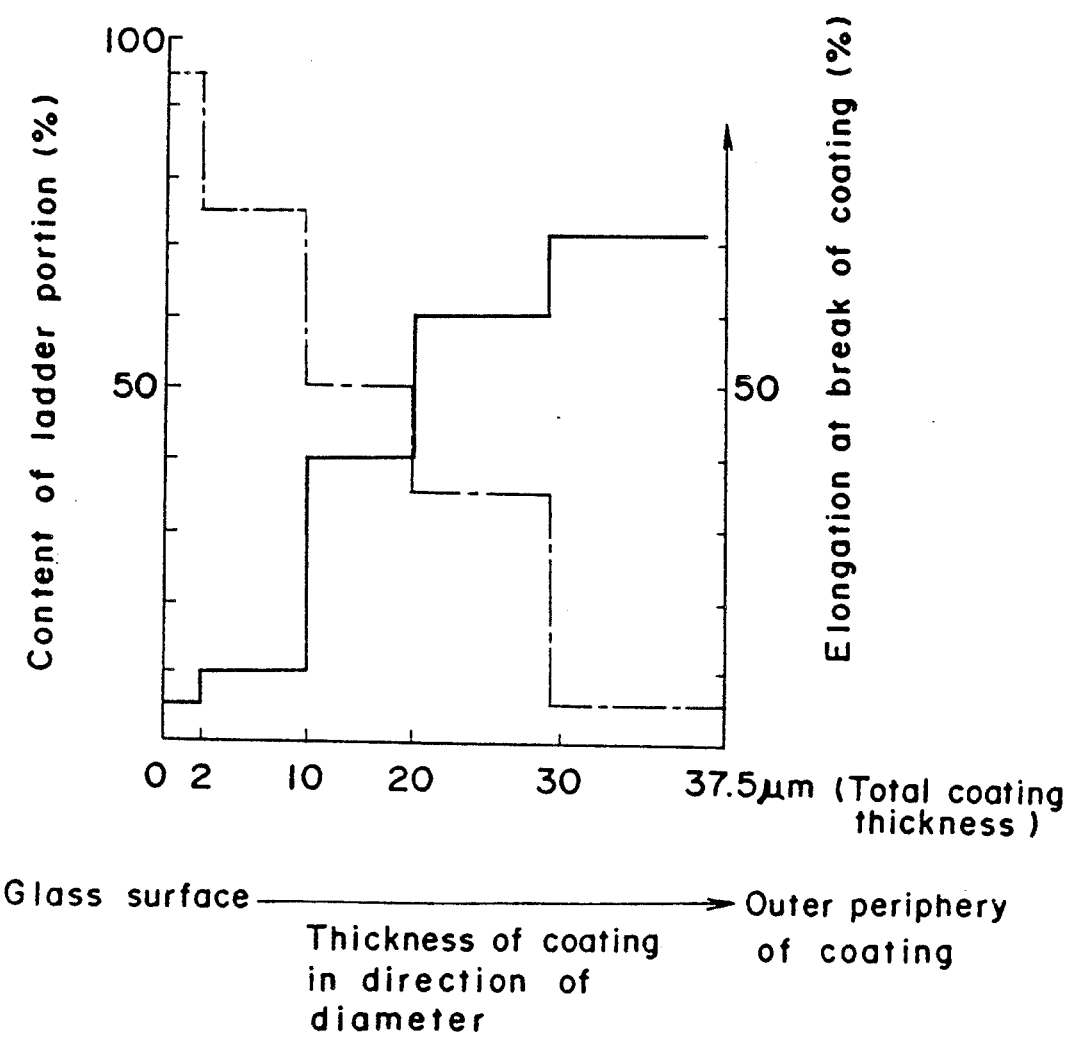

OPTICAL FIBER HAVING A PROTECTIVE COATING

BACKGROUND OF THE INVENTION

1. Field of the Invention

The present invention relates to an optical fiber. More particularly, it relates to an optical fiber which has a protective coating with high strength and high thermal resistance.

2. Description of the Related Art

An optical fiber glass easily breaks because of flaw when it has no coating. Therefore, the glass is coated by a thermosetting, ultraviolet light curing or thermoplastic resin to make a protected optical fiber which is used as a light-guiding medium in an optical fiber cable.

By the way, the optical fiber is used in various fields. It is desired to use the optical fiber under specific circumstances other than usual circumstances. Particularly, it is required to develop the thermally resistant optical fiber which can be used under the circumstances subjected to high thermal energy or radiation energy, such as in an oil well mining apparatus, a power and light composite cable, a cable in artificial satellite. To this end, ladder type polyorganosiloxane is attractive as a thermally resistant coating resin material.

However, in addition to the requirement of thermal resistance in use, the protective coating must have suitable elongation in view of handling of the optical fiber. The coating of such ladder type polyorganosiloxane and other resin cannot satisfy the thermal resistance and the elongation simultaneously. If the thermal resistance is sufficient, the protective coating has low elongation and then the optical fiber cannot be practically used, and vice versa.

SUMMARY OF THE INVENTION

An object of the present invention is to provide an optical fiber which has the coating with good thermal resistance and elongation.

This and other objects are achieved by an optical fiber which comprises a light-guiding glass fiber and a coating around the glass fiber, the coating consisting of at least two layers of polyorganosiloxane resin compositions having a ladder portion and a linear portion, and a ratio of the ladder portion and the linear portion in one layer being different from that in other layer.

BRIEF DESCRIPTION OF THE DRAWINGS

FIG. 1 shows a cross-sectional view of one embodiment of an optical fiber according to the present invention, and FIG. 2 is graph which shows a relationship between an elongation at break and a composition of a coating layer of an optical fiber according to the present invention.

DETAILED DESCRIPTION OF THE INVENTION

In a preferable embodiment, the content of the ladder portion in the polyorganosiloxane resin of the outer layer of the coating is smaller than that of the inner layer of the coating.

The polyorganosiloxane is preferably a random copolymer of the general formula:

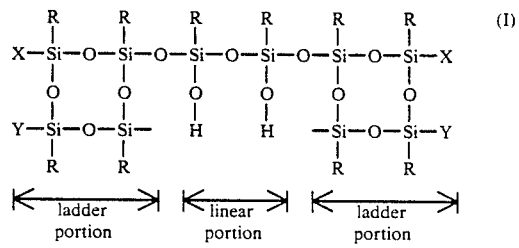

wherein R is an alkyl group having 1 to 5 carbon atoms such as a methyl group or a phenyl group, X and Y are a hydroxyl group or an alkoxy group having 1 to 5 carbon atoms such as a methoxy group.

The polyorganosiloxane comprises the ladder portion having the repeating unit of the formula:

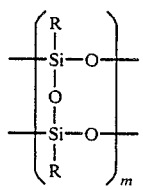

and the linear portion having the repeating unit of the formula:

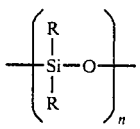

and has a molecular weight of 1,000 to 100,000 before curing and not smaller than 1,000,000 after curing.

The content of the ladder portion is defined by the equation:

$$[m/(m+n) \times 100].$$

In the polyorganosiloxane, a high content of the ladder portion gives high Young's modulus and good thermal resistance, and a high content of the linear portion gives low Young's modulus and large elongation but gives poor thermal resistance in a similar level to a conventional linear polyorganosiloxane.

At least one layer in the coating preferably contains a metal oxide. Examples of the metal oxide are titanium oxide, zinc oxide, lead oxide, iron oxide, aluminum oxide, silicon oxide, chromium oxide, molybdenum oxide, magnesium oxide, cobalt oxide and double oxides thereof. Titanium oxide is particularly preferable.

In the case where at least one layer in the polyorganosiloxane coating contains the metal oxide, when the layer in the polyorganosiloxane coating cures on the glass fiber, the metal oxide relaxes the shrinkage in curing and suppresses ununiform curvature (microbending) of the fiber.

According to experiments, shrinkage in curing is about 5% when no metal oxide is added, and 0.5 to 1% when metallic oxide is added. Therefore, no increase of transmission loss because of micro-bending occurs, and the optical fiber has good light transmission property.

Since the metal oxide has no effect on the strength and the thermal resistance of polyorganosiloxane, the polyorganosiloxane coating has good strength and good thermal resistance which the ladder polyorganosiloxane resin inherently has.

The metal oxide is preferably in the form of fine powder and has an average diameter of 0.01 to 1 μm.

An amount of the metal oxide is preferably from 3 to 30 parts by weight based on 100 parts by weight of the polyorganosiloxane.

The polyorganosiloxane composition coating layer can be used as outer-most coating layer of the fiber. But, since it is often difficult to make the thick and smooth coating layer, after making the polyorganosiloxane composition coating layers, an energy radiation curing resin such as a thermosetting resin or an ultraviolet curing resin is applied to make the fiber having a desired outer-most diameter.

FIG. 1 shows a cross-sectional view of one embodiment of the optical fiber according to the present invention. A coating 2 which protects a glass fiber 1 comprises resin compositions based on the polyorganosiloxane having the ladder portion and the linear portion. The coating 2 consists of a first layer 21, a second layer 22, a third layer 23, a fourth layer 24 and a fifth layer 25. Each of the layers 21 to 25 comprises polyorganosiloxane having different ratios of the ladder portion and the linear portion. From the first layer 21 which is closest to the glass fiber toward the outer periphery, the content of the ladder portion in polyorganosiloxane decreases.

FIG. 2 is a graph plotting the coating thickness from a surface of the glass fiber 1 toward the outer periphery of the coated fiber of FIG. 1 according to the present invention, namely coating thickness from the first layer 21 to the fifth layer 25 as an abscissa, and a content (%) of ladder portion in polyorganosiloxane as a left ordinate and an elongation at break (%) of the coating as a right ordinate. From this graph, it is understood that the higher the content of the linear portion is, the larger the elongation at break is. In the coated fiber of the present invention, the plural coating layers are formed such that the elongation increases in order from the first coating layer to the outer periphery. Flexibility is remarkably improved in comparison with a coating of the ladder polyorganosiloxane resin having a single composition.

Since the polyorganosiloxane resin composition close to the glass fiber having the large content of the ladder portion has large Young's modulus and high thermal resistance, a mechanical protection and thermal resistance can be imparted to the glass fiber. Therefore, the coated optical fiber of the present invention has sufficient thermal resistance and flexibility.

The number of the coating layers in the coated optical fiber is at least two, but it is not limited. The thickness of each coating layer is not limited, but total thickness of the coating is preferably at least 20 μm, more preferably at least 200 μm. A thickness of each layer in the coating is preferably 2 to 20 μm.

The coated optical fiber of the present invention can be prepared by a usual procedure which applies a thermally curable resin composition. For example, each of the layers is applied by using a die, and cured in a thermally curing oven to form the coating.

The coating layer containing the metal oxide can be prepared as follows: The metal oxide is solved or dispersed in polyorganosiloxane by using a solvent such as toluene or an alcohol to prepare a mixture. The mixture is applied on the fiber immediately after drawing by using a die, heated in an infrared oven and cured simultaneously with evaporating the solvent to make a coating layer of 2 to 10 micrometers on the fiber.

Now, the present invention is explained by following examples.

EXAMPLE 1

A single mode glass fiber having a core diameter of 10 μm and a cladding diameter of 125 μm was coated with polyorganosiloxane resin compositions having various compositions, which consisted of 40 parts by weight of polyorganosiloxane (R is a methyl group and X and Y are a hydroxyl group, and a molecular weight before curing is 10,000 to 20,000), 60 parts by weight of isobutyl acetate and 4 parts by weight of a catalyst. Then, the polyorganosiloxane resin composition was cured to prepare a coated optical fiber having outer diameter of 200 μm and the five layer coating structure shown in FIG. 1.

A content of the ladder portion (a broken line) and elongation at break (a solid line) of each coating layer of the multi-layer coated fiber are shown in FIG. 2. A thickness of each of the first layer to the fifth layer was 2 μm, 8 μm, 10 μm, 10 μm and 7.5 μm, respectively. The content of the ladder portion of polyorganosiloxane was 95% 75%, 50%, 35% and 5% and the elongation at break was 5%, 10%, 40%, 60% and 70%, respectively. Namely, the composition and the property of the coated layers incline in the direction of the coating diameter.

The coated fiber was subjected to a heat cycle test which comprises 100 cycles between 400° C. and 20° C. (2 hours at each temperature). Increase of a transmission loss was small and not larger than 0.01 dB/km at wavelength of 1.3 μm, and an appearance of the fiber had no change.

The elongation at break of 50% probability in a Weibull distribution was 6.5% after said heat cycle test. This value was the same as an initial value of a conventional coated optical fiber having the diameter of 250 μm coated with an ultraviolet curing resin or a silicone resin.

The coated fiber after said heat cycle test was subjected to the 3.0 mm diameter mandrel winding static fatigue test, in which the fiber was wound around the mandrel having the diameter of 3.0 mm and kept standing, and a time required for breaking the glass by the bending strain d/D caused from the mandrel diameter D and the fiber diameter d was measured, whereby the life of the glass at the application of static stress is measured. Also in this test, the time for breaking was long and the same as an initial value of said conventional coated optical fiber.

EXAMPLE 2

A single mode glass fiber having a core diameter of 10 μm and a cladding diameter of 125 μm was coated with polyorganosiloxane resin compositions having various compositions, which consisted of 40 parts by weight of polyorganosiloxane (R is a methyl group or a phenyl group, X and Y are a hydroxyl group and a molecular weight before curing is 10,000 to 20,000), 60 parts by weight of isobutyl acetate and 4 parts by weight of a catalyst. An inner-most layer further contained 10 parts by weight of titanium oxide. Then the polyorganosiloxane resin composition was cured to prepare a coated optical fiber having outer diameter of 200 μm and the five layer coating structure shown in FIG. 1 and FIG. 2. A transmission loss was measured at the wavelength of 1.3 μm, and it was as low as 1.35 dB/km.

For comparison, a coated optical fiber was prepared in the same manner except that titanium oxide was not used. A transmission loss was measured at the wavelength of 1.3 μm, and it was 1.45 dB/km.

As is clear from the above results, the transmission loss of the optical fiber can be lowered by adding titanium oxide.

In Example 2, titanium oxide was used as the metal oxide. When other metal oxide such as zinc oxide, lead oxide, iron oxide, aluminum oxide, silicon oxide, chromium oxide, molybdenum oxide, magnesium oxide, cobalt oxide and double oxide thereof was added, the same result as in titanium oxide was obtained. Strength and thermal resistance of these optical fibers were measured, and they are the same regardless of the presence or absence of the metal oxide. In addition, good results were obtained when two or more of these metal oxides were mixed and added.

What is claimed is:

1. An optical fiber which comprises a light-guiding glass fiber and a coating around the glass fiber, the coating consisting of at least two layers of polyorganosiloxane resin compositions wherein said siloxane resin is represented by the general formula:

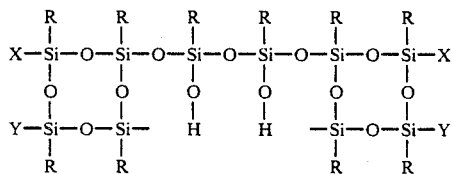

wherein R is an alkyl group having 1 to 5 carbon atoms or a phenyl group, X and Y are independently a hydroxyl group or an alkoxy group having 1 to 5 carbon atoms and a ratio of a ladder portion having repeating units of the formula:

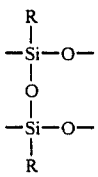

and a linear portion having repeating units of the formula:

in one layer is different from that in other layer.

2. The optical fiber according to claim 1, wherein the content of the ladder portion in polyorganosiloxane of an outer layer in the coating is smaller than that of an inner layer in the coating.

3. The optical fiber according to claim 1, wherein at least one layer in the coating contains a metal oxide.

4. The optical fiber according to claim 3, wherein the metal oxide is at least one selected from the group consisting of titanium oxide, zinc oxide, lead oxide, iron oxide, aluminum oxide, silicon oxide, chromium oxide, molybdenum oxide, magnesium oxide, cobalt oxide and double oxide thereof.

* * * * *